United States Patent [19]

Cohen

[11] Patent Number: 5,021,937
[45] Date of Patent: Jun. 4, 1991

[54] MAXIMUM DUTY CYCLE LIMITING OF PULSE WIDTH MODULATORS

[75] Inventor: Itzchak Cohen, Dix Hills, N.Y.
[73] Assignee: Lambda Electronics Inc., Melville, N.Y.
[21] Appl. No.: 423,236
[22] Filed: Oct. 18, 1989
[51] Int. Cl.$^5$ .............................................. H02M 1/14
[52] U.S. Cl. .................................... 363/41; 363/56; 363/97; 323/280
[58] Field of Search ................. 363/21, 26, 41, 56–58, 363/96, 97, 98; 323/280, 281, 285

[56] References Cited

U.S. PATENT DOCUMENTS

| | | | |
|---|---|---|---|
| 3,624,486 | 11/1971 | Oates | 363/41 |
| 4,642,748 | 2/1987 | Kirk | 363/41 |
| 4,791,544 | 12/1988 | Gautherin et al. | 363/49 |
| 4,858,094 | 8/1989 | Barlage | 363/41 |

Primary Examiner—Peter S. Wong
Attorney, Agent, or Firm—Morgan & Finnegan

[57] ABSTRACT

An apparatus is disclosed for maintaining accurate control of the maximum duty cycle generated by pulse width modulators. The output signal of a pulse width modulation comparator is averaged and compared to a reference value. This reference value is proportional to the peak value of the comparator's output voltage. A closed loop circuit continually adjusts the duty cycle so the difference between the reference value and the average comparator output is nulled thereby providing an accurate maximum duty cycle output.

6 Claims, 2 Drawing Sheets

MAXIMUM DUTY CYCLE LIMITING OF PULSE WIDTH MODULATORS

FIELD OF THE INVENTION

The present invention relates to electronic power converters and more particularly to an apparatus for controlling the maximum pulse width duty cycle generated by pulse width modulators controlling such power converters.

BACKGROUND OF THE INVENTION

In some power converters, particularly those including isolation transformers, it is mandatory to limit the maximum duty cycle generated by the converter's pulse width modulator.

The duty cycle of the pulse width modulator output signal (which controls power converter "on-time") must be limited to a certain maximum which, to avoid damage or failure, may not be exceeded under any condition; transient or steady state. This possibility for damage is due to the transformer's inability to demagnetize at large duty cycle ratios and it emphasizes the importance of accurately setting the maximum duty cycle value.

FIG. 1(a) illustrates a prior art pulse width modulator as implemented for example by the Unitrode UC3825 high speed PWM controller.

As shown, the Unitrode PWM function is performed by comparator 1 which receives as one input a voltage $V_1$ derived from an error amplifier (not shown), and as a second input, a sawtooth signal $V_2$ (illustrated in FIG. 1(b)) which is generated by an oscillator (not shown).

The two inputs cause the output of the PWM comparator to be high as long as the sawtooth voltage $V_2$ is lower in amplitude than the error voltage $V_1$, and to be low when the sawtooth voltage $V_2$ exceeds the voltage $V_1$.

The duty cycle δ is mathematically defined as:

$$\delta = \frac{t_{on}}{T} ; \quad (1)$$

where $t_{on}$ is the time interval when the output of the PWM comparator is high, and T is the entire period of the signal.

Viewing FIGS. 1(b) and 1(c), the duty cycle δ at the output of the Unitrode PWM modulator is varied from zero to unity as the value of the error voltage $V_1$ varies from less than the lowest value of sawtooth voltage $V_2$ (i.e. $V_{valley}$) to more than the highest value of sawtooth voltage $V_2$ (i.e., $V_{peak}$).

To limit the maximum duty cycle to a value lower than unity, the prior art method limits $V_2$ by applying a voltage clamp 2 to the PWM comparator input. A circuit implementation of this method is shown in FIG. 1(a) where a diode 3 and adjustable source 2 are used to set a clamp level, $V_{clamp}$. A waveform illustrating the method is shown in FIG. 1(c).

Assuming for illustration that the value of $V_{clamp}$ is made equal to $V_{peak}/2$, and that the forward drop of diode 3 is negligible, then under these conditions the Unitrode maximum duty cycle will be limited to 50%.

This method of duty cycle limiting, although simple, is extremely inaccurate. The duty cycle calibration is affected by several factors that vary from circuit to circuit, and also vary for a given circuit as the ambient temperature and the supply voltage of the circuit changes.

These factors include:
Initial accuracy and temperature stability of $V_{clamp}$;
Initial accuracy and supply/temperature stability of $V_{peak}$;
Initial accuracy and supply/temperature stability of $V_{valley}$;
Initial value and supply/temperature stability of the response time of comparator 1.

The cumulative effect of the above variations may be very significant. They may amount to a sizeable tolerance in the maximum duty cycle setting. Accommodation of this tolerance requires trade offs in the design of the converters that adversely affect performance parameters such as power density, efficiency and cost.

It is therefore one object of this invention to provide an improved technique in power conversion circuits for limiting the maximum duty cycle of a pulse width modulator to an accurate value.

It is still a further object of the present invention to provide accurate PWM duty cycle limiting circuits which vary within close tolerances from circuit to circuit.

It is yet a further object of the present invention to provide an accurate PWM duty cycle limiter which is virtually unaffected by temperature and circuit voltage changes.

SUMMARY OF THE INVENTION

The invention may generally be described as a technique for use in power conversion systems employing a pulse width modulated (PWM) system control signal, for accurately and stably setting the maximum duty cycle of the PWM signal. The technique employs:

(a) means for generating a reference PWM signal having a preset duty cycle representing a maximum value;

(b) means for comparing said reference PWM signal with said system PWM signal such that the maximum duty cycle of the latter is determined by that of the former.

DESCRIPTION OF THE PREFERRED EMBODIMENT

Figure 1A:
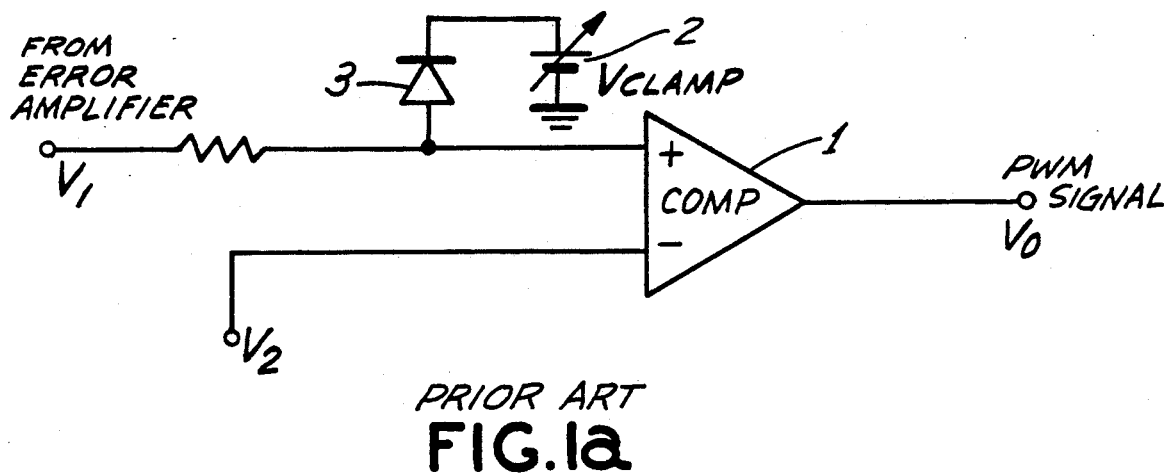
FIG. 1(a) is a schematic diagram which depicts a prior art PWM circuit.
Figure 1B:
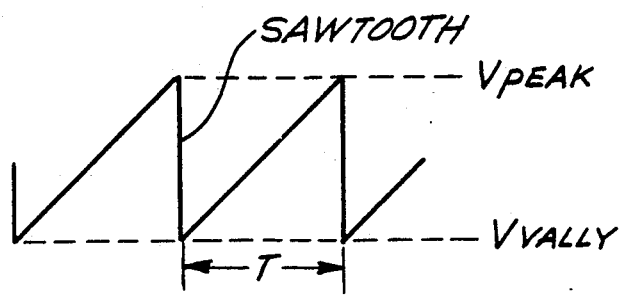
FIG. 1(b) is an illustration of a sawtooth timing signal $V_2$.
Figure 1C:
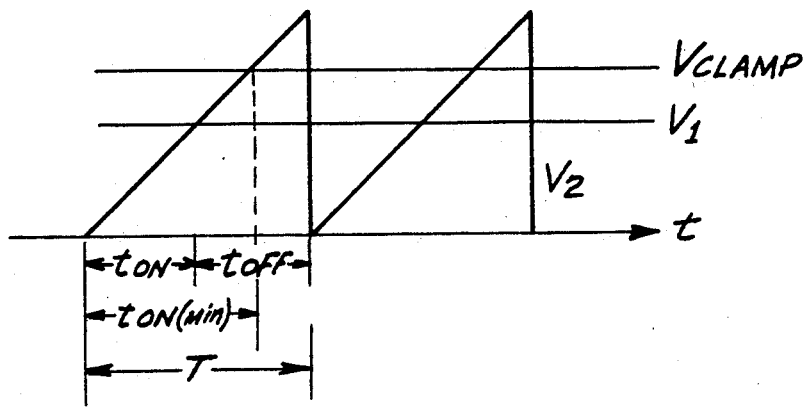
FIG. 1(c) is an illustration of how the PWM signal output by the circuit shown in FIG. 1(a) compares to the sawtooth timing signal shown in FIG. 1(b).
Figure 2:
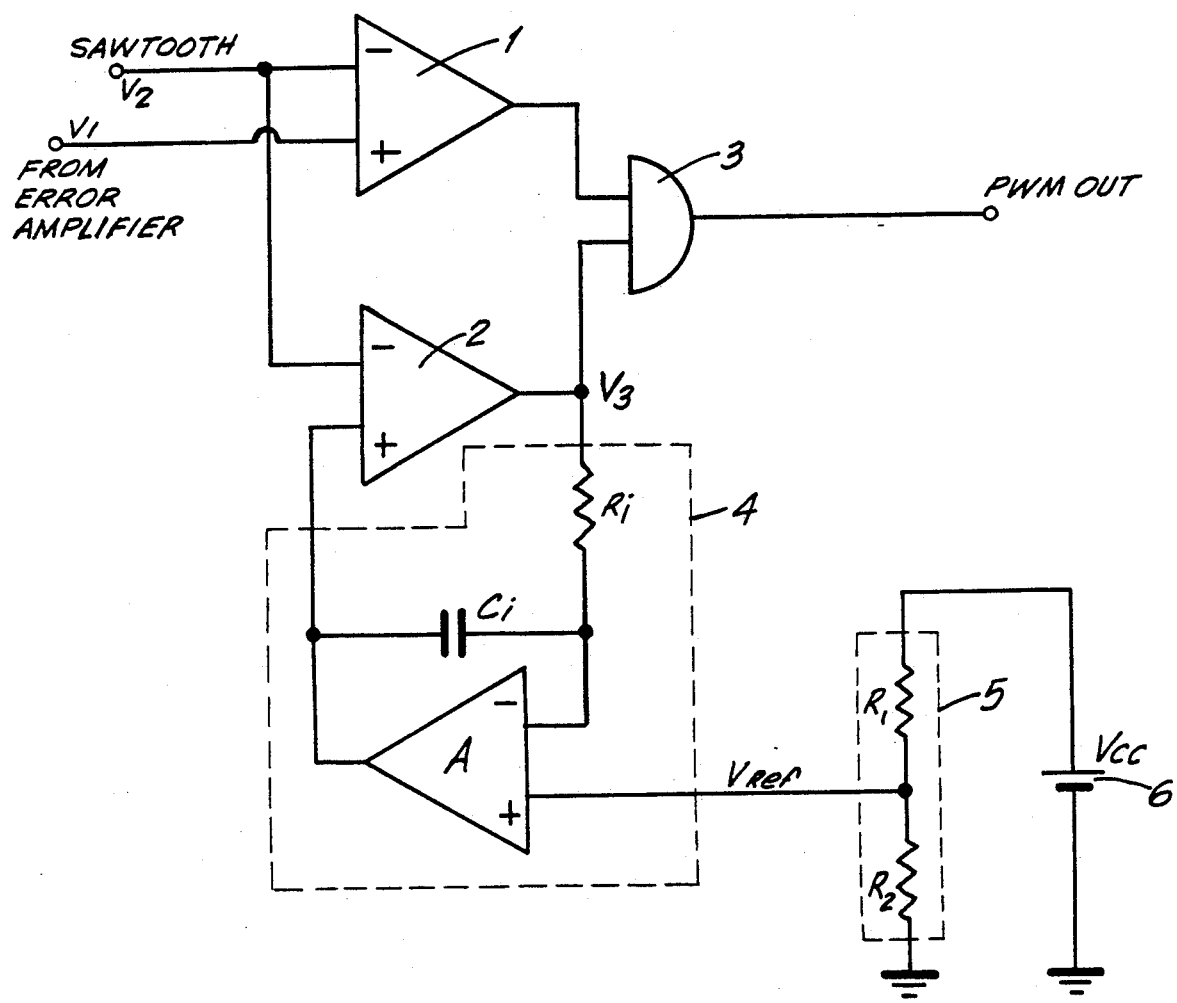
FIG. 2 is a schematic diagram which shows a preferred embodiment of the present invention.

FIG. 2 illustrates a preferred embodiment wherein a sawtooth timing signal $V_2$ is fed to the inverting inputs of comparators 1 and 2. Supplying the non-inverting input of comparator 1 is output voltage $V_1$ of an error amplifier (not shown).

The outputs of comparators 1 and 2 are fed to the inputs of AND logic gate 3. In addition, the output of comparator 2 is connected to its non-inverting input via an integrator 4 implemented with an operational amplifier A having an input resistor Ri and a feedback capacitor $C_i$. The non-inverting input of integrator 4 receives a DC voltage $V_{ref}$ derived from resistive divider 5 ($R_1$, $R_2$) connected across the circuit's supply voltage $V_{cc}$.

In operation, comparator 1 generates a pulse width modulated signal PWMout by comparing the sawtooth timing signal $V_2$ to the output voltage of the error amplifier.

The second comparator 2 also generates a PWM signal, in this case as a result of the sawtooth timing signal $v_2$ at one input and the output of integrator 4 at the other.

AND gate 3, which receives the outputs of the two PWM comparators, provides an output PWMout dominated by that comparator (1 or 2) which produces the lower duty cycle signal.

The comparator circuit parameters in the preferred embodiment are chosen to provide a voltage swing from close to $V_{cc}$ when in the "high" state to near zero in the "low" state. Consequently, the average, $V_{av}$, of the voltage $V_3$ at the output of the second comparator 2 is the product of the voltage $V_{cc}$ and the duty cycle of comparator 2. Thus:

$$V_{av} = V_{cc} \times \delta_2 \qquad (2)$$

The duty cycle, $\delta_2$ of comparator 2 is a function of the voltage at its non-inverting input. This input is the output of the integrator 4.

The output of integrator 4 is such as to null its input, that is, to provide at its inverting input, a voltage whose average value is substantially equal to its non-inverting input, $V_{ref}$.

The latter is given by:

$$V_{ref} = V_{cc} \times R_1/(R_1 + R_2). \qquad (3)$$

Thus, at steady state, the output of, integrator 4 will cause PWM comparator 2 to generate a signal $V_3$ whose average value, $V_{av}$, equals $V_{ref}$. That is $$V_{av} = V_{cc} \times \delta_2 = V_{ref} = V_{cc} \times \frac{R_1}{(R_1 + R_2)}; \qquad (3)$$

Thus, $$V_{cc} \times \delta_2 = V_{cc} \times \frac{R_1}{(R_1 + R_2)} \qquad (4)$$

Eliminating the $V_{cc}$ term on both sides of (4) yields:

$$\delta_2 = \frac{R_2}{R_1 + R_2} \qquad (5)$$

As a result, and since $V_{av}$ is applied to gate 3, the maximum duty cycle $\delta_{max}$ selected at the output of the gate is equal to $\delta_2$ which is limited to a constant and accurate value. This constant and accurate value is independent of variations in the supply voltage, sawtooth parameters or response delays in the comparators. In effect, the actual value of the maximum duty cycle will be determined solely by the ratio of two resistances which can be preset or rendered adjustable.

If for any reason the minimum and maximum voltage values of comparator 2 do not have the previously described relation to $V_{cc}$, then appropriate compensation can be made in the selection of $R_1$ and $R_2$.

In practice, very accurate and stable ratios of resistors are easily attainable with discrete, printed or integrated resistors.

After considering the embodiment disclosed here, it will be apparent to those versed in the art that the illustrated maximum duty cycle limiting technique shown can be employed by various modifications of the disclosed embodiment without departing from the spirit of the invention. These may include, for example, changing the logic from positive to negative, using alternate timing waveforms, employing duality, etc.

What is claimed is:

1. In a power conversion system employing a pulse width modulated (PWM) system control signal, means for accurately and stably setting the maximum duty cycle of said system signal comprising:
   (a) means for generating a reference PWM signal having a pre-set duty cycle for establishing said maximum duty cycle; and
   (b) means for comparing said reference PWM signal with said PWM system control; signal for producing a resultant PWM system control signal whose duty cycle does not exceed said maximum duty cycle.

2. The system of claim 1 in which said generating means include a PWM source signal and means for controlling said source signal such that its average value is a function of said pre-set duty cycle.

3. A system according to claim 2 in which said generating means include means for controlling said pre-set duty cycle substantially solely as a function of a resistance ratio.

4. In a power conversion system employing a pulse width modulated (PWM) system control signal, a method for accurately and stably setting the maximum duty cycle of said system control signal, comprising the steps of:
   (a) generating a reference PWM signal having a pre-set duty cycle for establishing said maximum duty cycle; and
   (b) comparing said reference PWM signal with said system control signal such that the duty cycle of a resultant PWM signal does not exceed said maximum duty cycle.

5. The method of claim 4, further including the step of controlling a PWM source signal used in generating said reference PWM signal, such that said source signal's average value is a function of said pre-set duty cycle.

6. The method of claim 5 further including the step of nulling the average value of said reference signal with said source signal.

* * * * *